United States Patent [19]

Livian

[11] Patent Number: 4,651,425

[45] Date of Patent: Mar. 24, 1987

[54] HACKSAW

[75] Inventor: Andre Livian, Seal Beach, Calif.

[73] Assignee: Alltrade, Inc., Commerce, Calif.

[21] Appl. No.: 852,550

[22] Filed: Apr. 16, 1986

[51] Int. Cl.$^4$ .............................................. B27B 21/00
[52] U.S. Cl. ......................................... 30/507; 30/156
[58] Field of Search ................ 30/507, 508, 510, 511, 30/156

[56] References Cited

U.S. PATENT DOCUMENTS

| | | | |
|---|---|---|---|
| 1,175,582 | 3/1916 | Bangert | 30/511 |
| 1,380,628 | 6/1921 | Barner | 30/508 |
| 1,728,992 | 9/1929 | Frank | 30/156 |
| 2,667,195 | 1/1954 | Kilmer | 30/510 |
| 2,920,668 | 1/1960 | Leist | 30/510 |
| 3,756,298 | 9/1973 | West | 30/507 |
| 3,821,974 | 7/1974 | Merrow | 30/508 |
| 4,606,123 | 8/1986 | Wrench | 30/156 |

*Primary Examiner*—Jimmy C. Peters
*Attorney, Agent, or Firm*—Albert O. Cota

[57] ABSTRACT

A hand held hacksaw which has a handle (20) formed of two pieces with pair of parallel recesses (22) inside. A support arm (28) with, a straight end and an angular end, is inserted into the upper recess also a hacksaw blade (32) is placed in the lower recess, a groove (30) is formed in the arm at the intersection of the blade for support and stability. A screw (38) and nut (40) hold the handle together and unify all of the elements in their preselected position.

5 Claims, 25 Drawing Figures

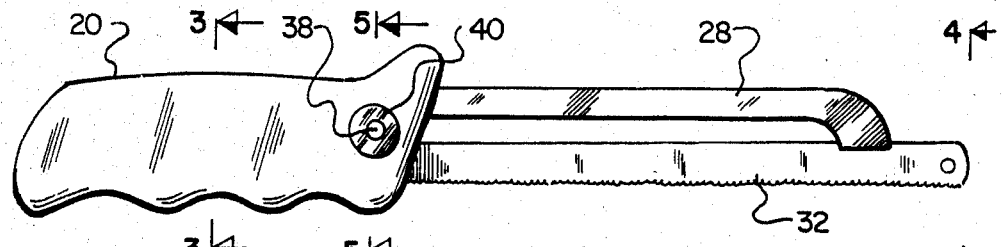
Fig.1.
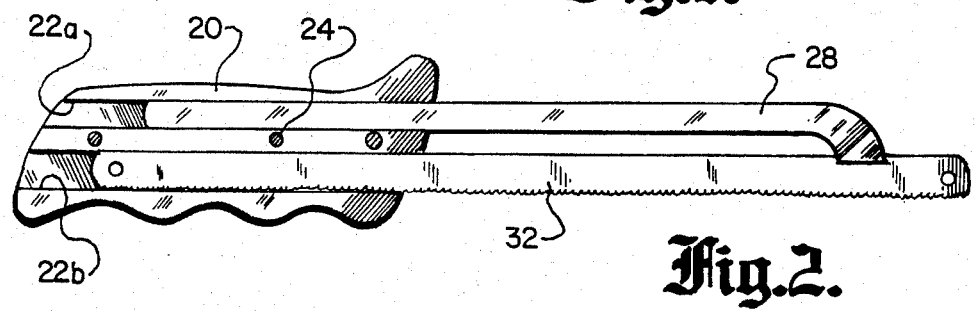
Fig.2.
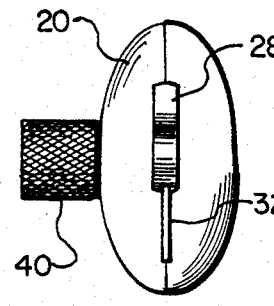 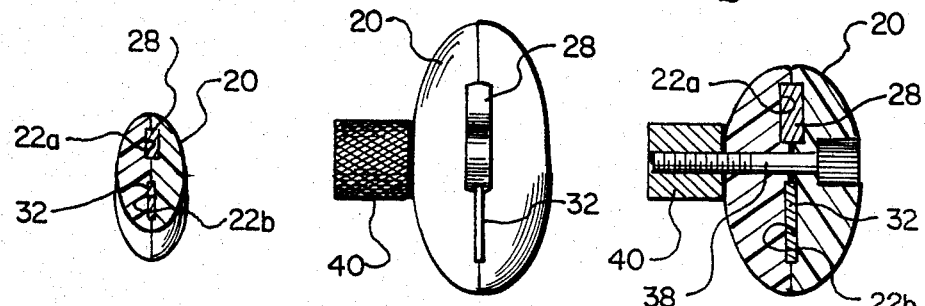 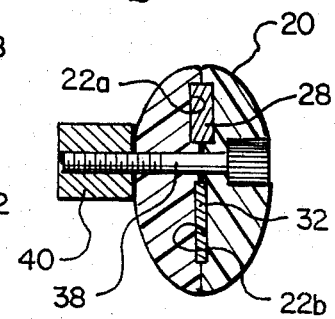
Fig.3.    Fig.4.    Fig.5.
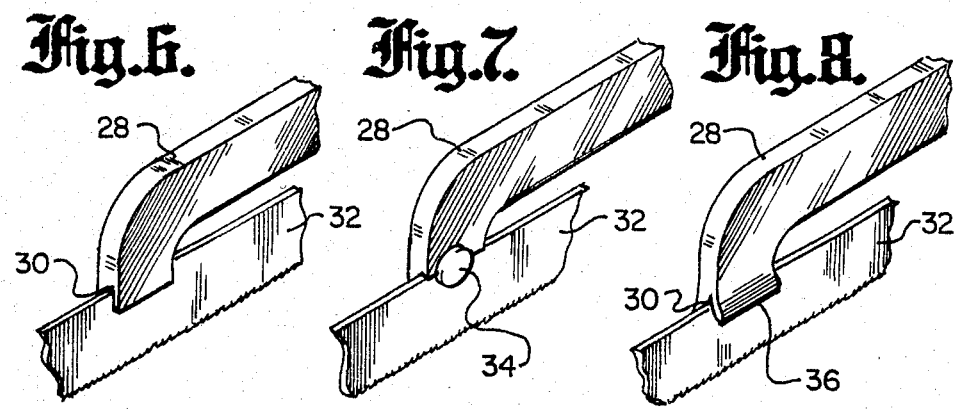
Fig.6.    Fig.7.    Fig.8.

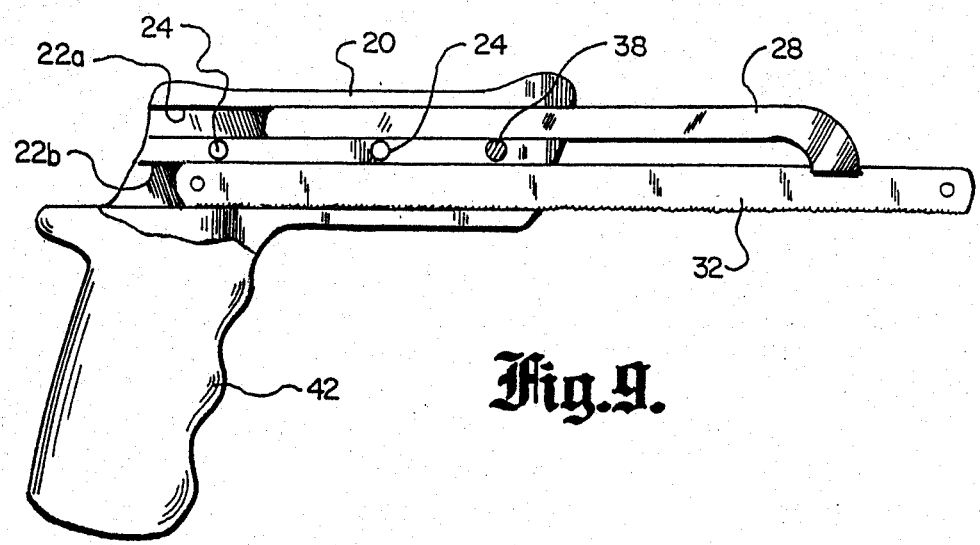
Fig.9.
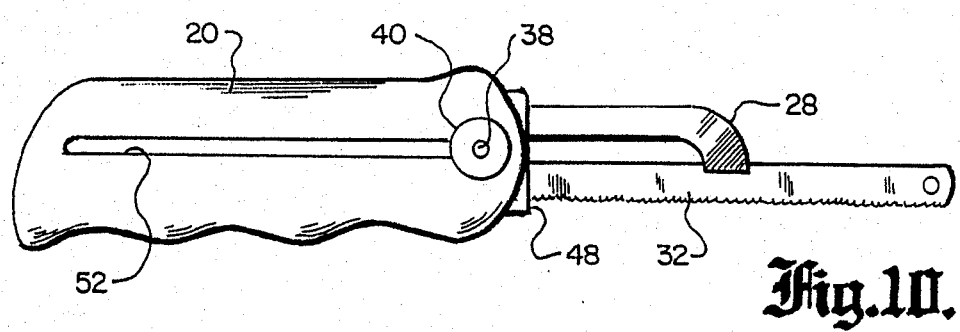
Fig.10.
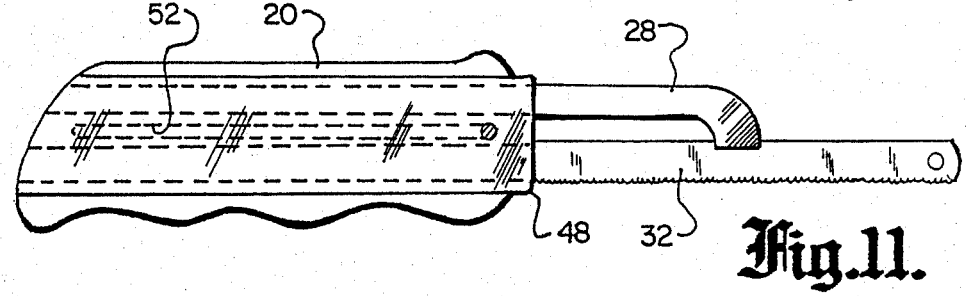
Fig.11.
Fig.12.
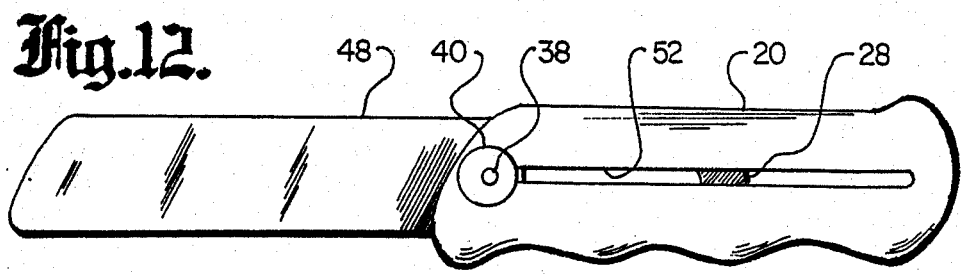

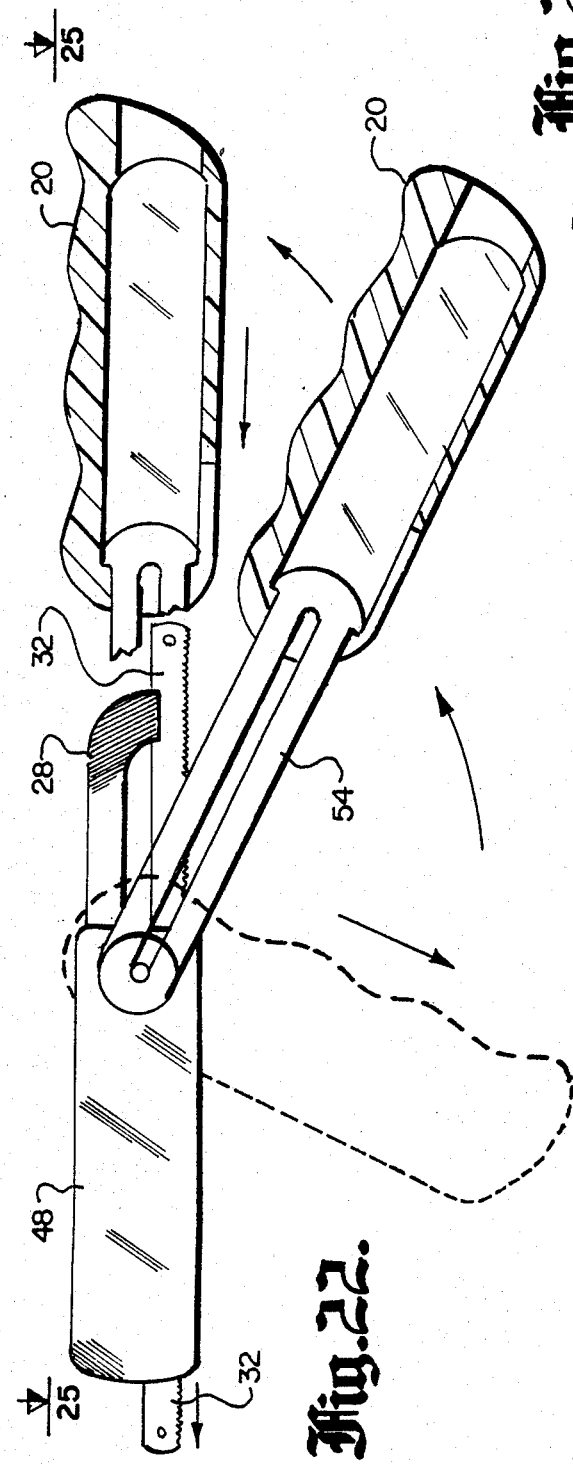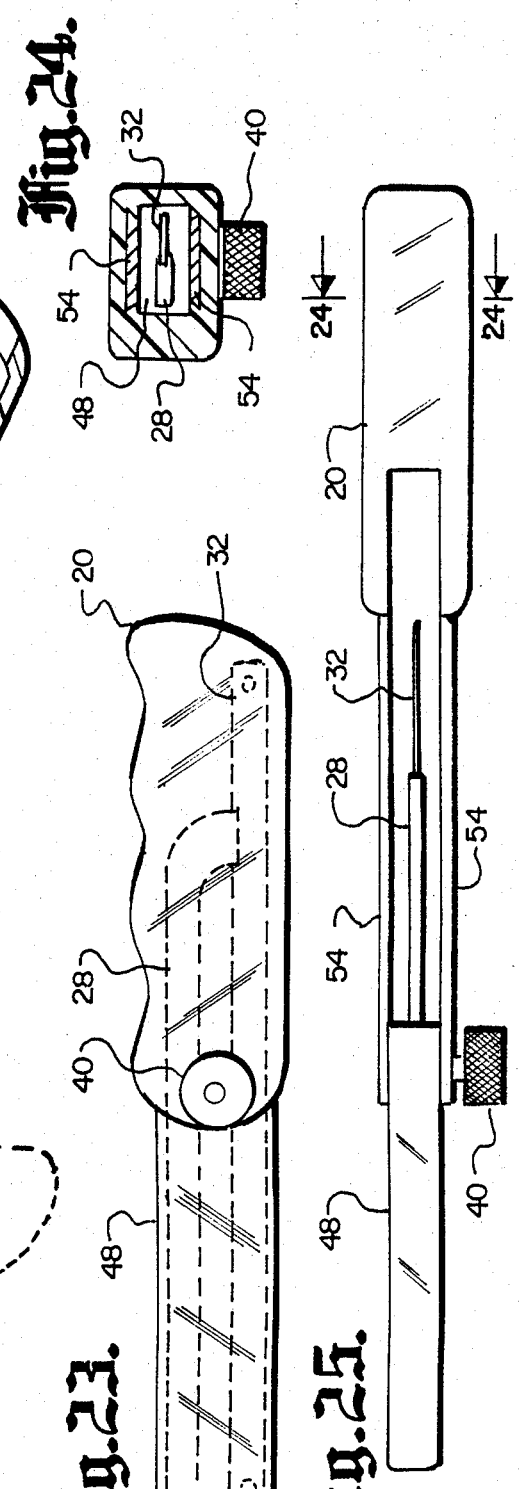

HACKSAW

TECHNICAL FIELD

The present invention relates to hacksaws in general and, more specifically, to a hand held hacksaw blade holder having a separable handle and adjustable support arm.

BACKGROUND ART

Previously, many different and varied hacksaws have been in use utilizing thin hacksaw blades that are employed mostly for cutting metal and hard material. Generally speaking, this type of saw may be grouped as a keyhole type, as the blade is made to be extended and does not utilize a connection on both ends through the holes provided as in the more conventional styles. Further, the blade may be extended in a unsupported manner making the blade provide its own structure. The more conventional type, tensionsthe blade taute between the ends with structure therebetween. Many attempts have been made to make the keyhole type practical, some completely unsupporting the blade, and others attaching the blade compressibly on the end.

A search of the prior art did not disclose any patents that read directly on the claims of the instant invention however, the following U.S. patents were considered related:

| PATENT NUMBER | INVENTOR | ISSUED |
| --- | --- | --- |
| 3,756,298 | West | 4 September 1973 |
| 3,447,580 | Keymer | 3 June 1969 |
| 2,966,931 | Dreier | 3 January 1961 |
| 2,920,668 | Leist | 12 January 1960 |
| 2,331,638 | Taylor | 12 October 1943 |

West teaches a single one piece construction that utilizes a tensioning screw on an elongated end, with the blade projecting through the handle portion.

Keymer discloses, a tool that is very similar to the above except the handle and arm are separate elements, with the arm formed of two parts.

Dreier does not retain the blade with his wedge shaped sheath, instead it is contained within the wedging shape, pressing the blade into the cavity when in use, with pressure on the blade. Retension is made with a threadable compression ring clamping the blade into the handle by tightening the ring.

Leist uses two separate halves of a handle having a pistol grip. In one embodiment, the blade is tensioned using the hole in the end of the blade with an angular arm for support.

Finally, Taylor teaches a one piece construction with a hollow tubular handle, and, a split two piece finger with a screw clamping the pieces together.

It will be seen that the prior art has approached the problem of attaching the blade with a screw at the end of the arm, wedging it into a full length sheath, or utilizing the hole in the end of the blade. This method does not provide for firmly grasping the blade as only a small area is in contact with the blade.

For background purposes and as indicative of the art to which the invention relates, reference may be made to the remaining cited patents.

| PATENT NO. | INVENTOR | ISSUED |
| --- | --- | --- |
| 2,490,094 | Rogers | 6 December 1949 |
| DES 246,416 | Schmidt | 22 November 1977 |
| DES 228,225 | West | 28 August 1973 |
| DES 207,247 | Reuterfors | 21 March 1967 |

DISCLOSURE OF THE INVENTION

While many attempts have been made to attach the blade to a handle, to stop it from slipping, and hold it rigid enough to allow the sawing motion to be accomplish, without twisting, the problem still arises as to its available surface, and attachment within the handle.

The instant invention solves this problem by supporting the blade at the end of the arm within a groove, the same baric width as the blade, and, applying a compressive force on the handle near the point of entrance. This allows the blade to be fixed securely with ample surface employed and the end of the blade to be held rigidly within the groove. With this in mind, the primary object has been realized with one single compression screw serving the function of attachment and retainment.

An important object allows the arm to be adjusted, in length, independent of the length of the blade protrusion from the handle. This allows a large stroke to be accomplished on some work, where required, and a short extension on others where more stability of the blade is needed. This configuration permits the blade to be extended beyond the arm where the work piece requires flexing of the blade against a flat surface.

Another object of the invention provides adjustment without the need of tools, using, a threaded nut of sufficient size to grasp easily. This convenience of operation is important in areas where the user is away from other tools.

Still another object of the invention provides an unitized method of construction, as the handle is in two separate pieces without re-entering angles and undercuts making the tooling cost effective. Further, the single arm is easily constructed and the fastening means are conventional and easy to obtain in quantities.

Yet another object of the invention is taught in the embodiment containing a blade enclosure that encompassesthe blade for safety during storage when not in use, as the blade is completely retained within a protective cover.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 1 is a side elevational view of the preferred embodiment.

FIG. 2 is a side elevational view of the preferred embodiment with one handle completely removed for clarity.

FIG. 3 is a cross-sectional view taken along lines 3—3 of FIG. 1.

FIG. 4 is a cross-sectional view taken along lines 4—4 of FIG. 1.

FIG. 5 is a cross-sectional view taken along lines 5—5 of FIG. 1.

FIG. 6 is a partial isometric view of the preferred embodiment with a single groove in the end.

FIG. 7 is a partial isometric view of the preferred embodiment with a rivet forming the groove in the end.

FIG. 8 is a partial isometric view of the preferred embodiment with the groove swaged in the end.

FIG. 9 is a cutaway side elevational view of the preferred embodiment with a pistol grip added.

FIG. 10 is an elevational view of the third embodiment.

FIG. 11 is a cutaway elevational view of the third embodiment.

FIG. 12 is a cutaway elevational view of the third embodiment with the enclosure over the blade.

FIG. 22 is a side view of the fourth embodiment.

FIG. 23 is a side view of the fourth embodiment with the blade in the enclosure.

FIG. 24 is a cross-sectional view taken along lines 24—24 of FIG. 25.

FIG. 25 is a top view of the fourth embodiment.

BEST MODE FOR CARRYING OUT THE INVENTION

Figure 13:
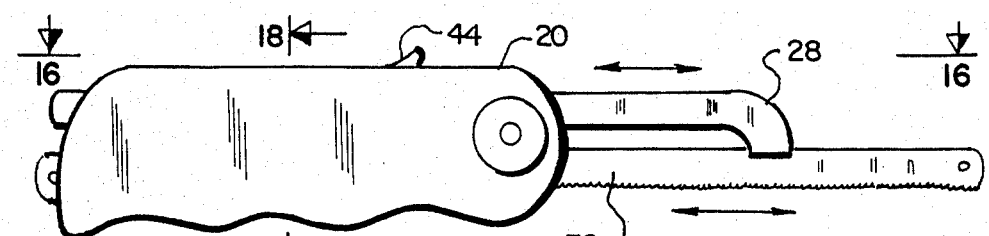
FIG. 13 is an elevational view of the second embodiment.

The best mode for carrying out the invention is presented in terms of a preferred, second, third and fourth embodiment. All four embodiment are primarily designed to form a handle to conveniently hold a hacksaw blade.

The preferred embodiment, as shown in FIGS. 1 through 9 is comprised of handle means 20 that conforms to the shape of one's hand when gripped tightly. This handle 20 is formed in two separate opposed pieces. Each piece is further comprised of a pair of opposed recesses 22a and 22b that are parallel with each other. These recesses form a closed longitudinal cavity when the handle pieces are placed together. A pair of male pins 24 are located in one handle piece 20 and mating sockets 26 in the other. When these are joined together, they form an integral unitary handle, allowing alignment of the handle pieces when linked together.

A support arm 28, is formed with a straight portion on the first end, and, a right angle bend on the second end. The second end contains a groove 30, that is parallel with the straight portion. The groove 30 may be formed in three separate methods as depicted in FIGS. 6-8. The preferred embodiment is illustrated in FIG. 6 with a recessed groove within the material, the same width as that of a hacksaw blade 32.

Another embodiment is shown in FIG. 7, wherein the groove 30 is fashioned with a headed rivet 34 located through the second end forming a void between the rivet head and the arm 28. This void is the same width as that of a hacksaw blade 32.

The final embodiment is illustrated in FIG. 8 and consists of a swaged flare 36 formed from the material of the second end of the support arm 28. This groove 36 is also the same width as a hacksaw blade 32, and, the parent material is relocated outwardly away from the groove equally on each side.

The arm 28 is disposed within the upper recess 22a of the handle 20 in a slideable manner. The first end of the arm 28 is fully contained within the recess 22a, however, it is free to slide laterally in and out.

A hacksaw blade 32 likewise penetrates the recess 22b of the handle 22, in parallel relationship to the arm 28, with the groove 30 receiving and holding the blade 32 in the unsupported length. This arrangement provides a structural brace for the blade 32 at an adjustable distance from the handle 20.

Compression fastening means in the form of a headed capscrew 38, with flat sides on the head, in hexagonal or square configurations, is positioned penetrating the two halves of the handle 20. The capscrew 38 is joined with a round headed nut 40, having internal threads, that mate with the capscrew 38. This nut 40 has a tactile exterior surface, providing a gripping surface for one's fingers.

The screw 38 and nut 40 unify the handle halves 30, having arm 38 and blade 32 in a selected position. Thus, providing an adjustable length of protrusion of the blade 32 from the handle 20 and independent adjustable length of the arm 28, in relation to the handle 20.

Another embodiment of the handle 20 is depicted in FIG. 9 wherein a pistol grip 42 is added. This grip 42, extends angularly from the handle 20, and is formed integrally therewith. The grip 42, which can be made from one or two pieces, distends at an angle greater than 90 degrees such that the blade 32 is disposed at a position suitable for cutting when the grip 42 is held by one's hand.

Figure 14:
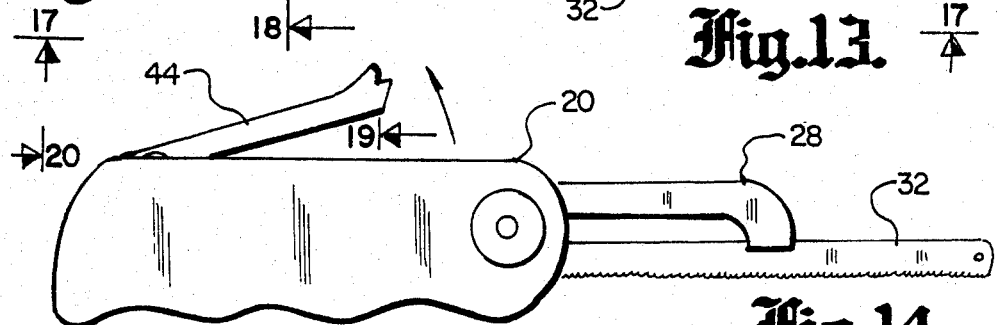
FIG. 14 is an elevational view of the second embodiment with the hinged top raised.
Figure 15:
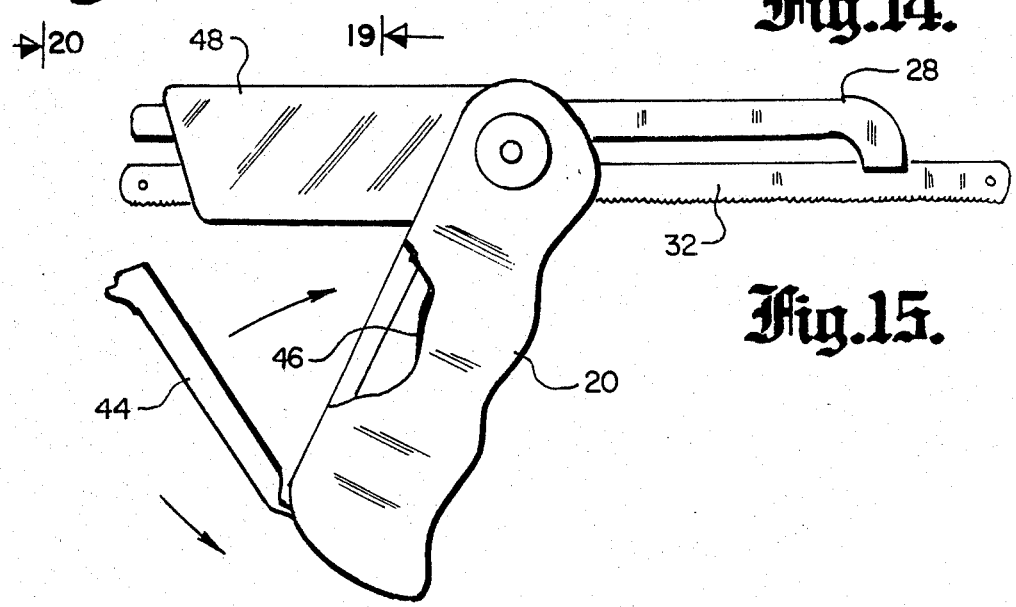
FIG. 15 is an elevational view of the second embodiment with the handle rotated as a pistol grip.
Figure 16:
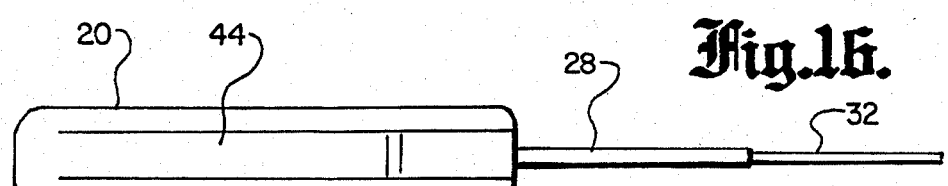
FIG. 16 is a top view of the second embodiment.
Figure 17:
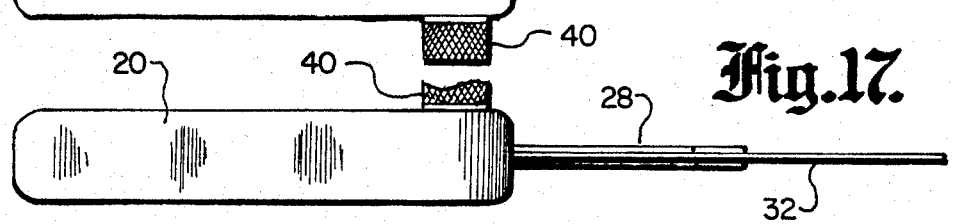
FIG. 17 is a bottom view of the second embodiment.
Figures 18, 19, 20:
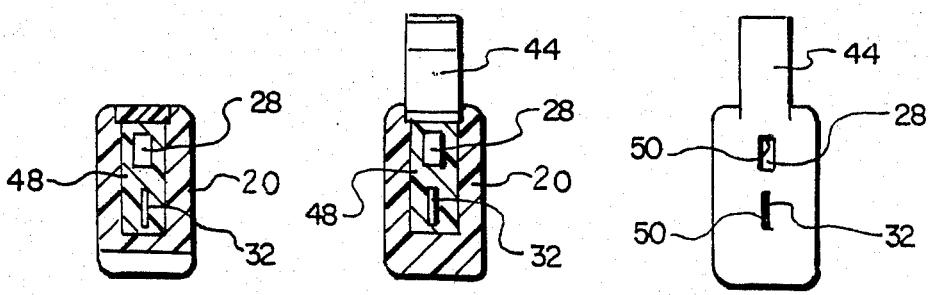
FIG. 18 is a cross-sectional view taken along lines 18—18 of FIG. 13.
FIG. 19 is a cross-sectional view taken along lines 19—19 of FIG. 13.
FIG. 20 is a cross-sectional view taken along lines 20—20 of FIG. 14.
Figure 21:
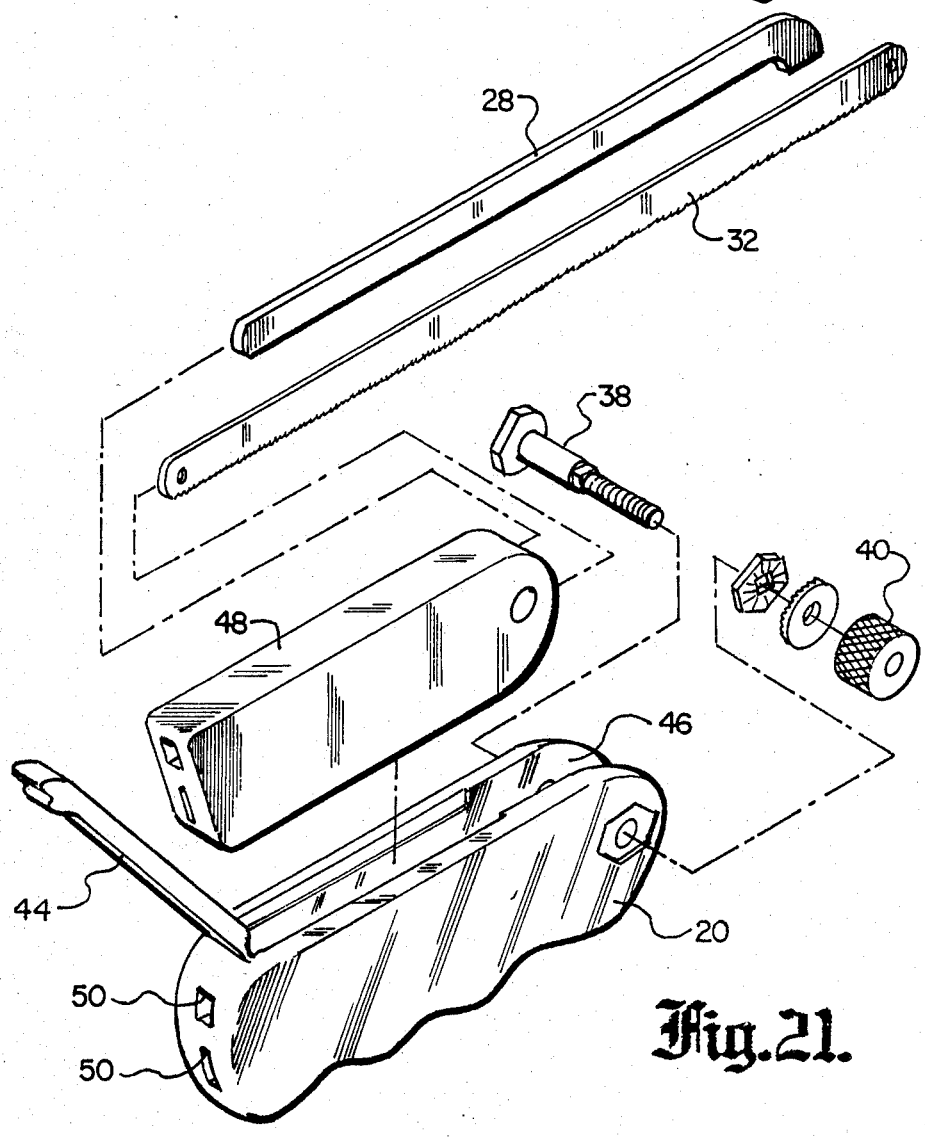
FIG. 21 is an exploded view of the second embodiment.

The second embodiment is illustrated pictorally in FIGS. 13-21 and is the same as the preferred embodiment, except that the handle 20 further contains a hinged top 44. This configuration forms a cavity 46 enclosed on all sides, except one end.

A blade enclosure 48 is also added, that is small enough in size to fit into the cavity 46 of the handle 20. The enclosure 48 contains a pair of parallel slots 50, identical to the recesses 22a and 22b in the handle 20 that retain the arm 28 and blade 32. With the enclosure 48 inside the handle 28, the hinged top 44 is closed completely encompassing the enclosure 48. An alternate operating position is shown pictorially in FIG. 15, where the handle 20 is rotated at right angles to the enclosure 48, creating a pistol grip. The hinged top 44, when closed, creates the stop necessary to obtain a convenient angle for the grip. The capscrew 38 and nut 40 now compress all of the elements together, as in the preferred embodiment.

The third embodiment is illustrated in FIGS. 10-12 and is similar to the second embodiment, having an enclosure 48, and the handle 20 except it does not contain a hinged top 44. Instead, the handle cavity 46, extends through the entire length, and the handle 20, further contains a slit 52 almost the entire linear distance of the element. This embodiment eliminates the pistol grip function, however, the enclosure 48 may be exposed as shown in FIG. 12 to protect the blade 32 during storage, as it is slid completely within the handle 20, encompassing the blade 32 and arm 48 within. The screw 38 and nut 40 simply follow the slit 52 from the front to the back.

The fourth embodiment is shown pictorially in FIGS. 22–25 and contains all of the elements of the third embodiment and the utility of the second embodiment. The difference lies in the use of a pair of slotted tracks 54, with one contiguously engaging each side of both the handle and the enclosure, allowing reversal of the enclosure 48 within the handle 20. The handle 20 may also be positioned, in pistol grip fashion, as depicted in FIG. 22, much like that of the second embodiment, with the tracks 54 stored within the handle 20. These tracks 54, consist of a flat plate with a slot in the centermost portion with radial ends larger than the width, forming an arresting shoulder. This shoulder limits the travel of the handle means 20 and blade enclosure 48, and retracts when placed in the storage position as shown in FIG. 23.

In operation, the blade 32 may be adjusted to any length of extension, as long as sufficient mass remains within the handle 20. The arm 28 may also be slid forward within the same limitations. Changing the blade 32 is accomplished by loosening the nut 40 and slipping the blade out of the handle 20.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the claims.

I claim:

1. A hand held saw utilizing an enclosed hacksaw blade for cutting comprising:
   (a) a handle conforming to the shape of one's hand when manually gripped having a hollow recess therewithin and a hinged top forming a cavity enclosed on all sides except one end,
   (b) a blade enclosure small enough in size to fit into the cavity in said handle, further having a pair of parallel slots continuing therethrough,
   (c) a support arm having a first end and a second end, the first end straight and the second end having a right angle bend thereupon with the termination thereof having a groove within parallel with the first straight end, the arm disposed within said blade enclosure,
   (d) a hacksaw blade penetrating said blade enclosure in parallel relationship to said support arm straight end with said second end groove receiving and holding the blade in the unsupported length providing a structural brace for the blade at an adjustable distance from the arm, with the enclosure entirely contained within the handle in one mode of operation and the handle positioned at right angles in another in pistol grip fashion, and,
   (e) compression fastening means holding the handle and the enclosure tightly against said support arm and said hacksaw blade in an adjustable manner so as to unify the elements in a selected position providing an adjustable length of protrusion of the blade from the handle means and independent adjustable length of the arm in relation to the blade.

2. The invention as recited in claim 1 wherein said groove in the support arm further comprises: a recessed groove within the parent material the same width as said hacksaw blade.

3. The invention as recited in claim 1 wherein said groove in the support arm further comprises: a headed rivet contained within said second end forming a void between the rivet head and the end, the void being the same width as the hacksaw blade.

4. The invention as recited in claim 1 wherein said groove in the support arm further comprises: a swaged flare forming the material of said support arm second end into an equal width groove with parent material on either side of the groove in equal proportions.

5. The invention as recited in claim 1 wherein said compression fastening means further comprises: a headed capscrew with flat sides on the head and male threads on the shank thereof rotatably joined with a round headed nut having internal threads.

* * * * *